(12) United States Patent
Zhou et al.

(10) Patent No.: US 8,045,790 B2
(45) Date of Patent: Oct. 25, 2011

(54) METHOD FOR AUTOMATICALLY DE-SKEWING OF MULTIPLE LAYER WAFER FOR IMPROVED PATTERN RECOGNITION

(75) Inventors: Jian Zhou, San Jose, CA (US); Hua Chu, Saratoga, CA (US)

(73) Assignee: Nanometrics Incorporated, Milpitas, CA (US)

( * ) Notice: Subject to any disclaimer, the term of this patent is extended or adjusted under 35 U.S.C. 154(b) by 492 days.

(21) Appl. No.: 12/208,177

(22) Filed: Sep. 10, 2008

(65) Prior Publication Data
US 2009/0010529 A1 Jan. 8, 2009

Related U.S. Application Data

(62) Division of application No. 09/974,721, filed on Oct. 9, 2001, now Pat. No. 7,433,509.

(51) Int. Cl.
G06K 9/00 (2006.01)
G06K 9/36 (2006.01)
(52) U.S. Cl. .................. 382/151; 382/144; 382/145
(58) Field of Classification Search .......... 382/144–145, 382/149, 151, 287, 289, 294; 348/87, 94, 348/95; 250/559.3, 559.37, 559.44
See application file for complete search history.

(56) References Cited

U.S. PATENT DOCUMENTS

| | | | |
|---|---|---|---|
| 4,475,122 A | 10/1984 | Green | |
| 4,536,239 A | 8/1985 | Benson | |
| 4,712,016 A | 12/1987 | Matsumura | |
| 4,938,600 A | 7/1990 | Into | |
| 5,048,178 A | 9/1991 | Bindra et al. | |
| 5,109,430 A | 4/1992 | Nishihara et al. | |
| 5,403,754 A | 4/1995 | Jackson | |
| 5,545,570 A | 8/1996 | Chung et al. | |
| 5,668,042 A | 9/1997 | Bae | |
| 5,696,835 A * | 12/1997 | Hennessey et al. | ........... 382/141 |
| 5,993,043 A | 11/1999 | Fuji | |
| 6,043,864 A | 3/2000 | Lo et al. | |
| 6,068,954 A | 5/2000 | David | |
| 6,240,208 B1 | 5/2001 | Garakani et al. | |
| 6,240,218 B1 | 5/2001 | Michael et al. | |
| 6,421,574 B1 | 7/2002 | Steffan et al. | |
| 6,424,881 B1 | 7/2002 | Steffan et al. | |
| 6,482,713 B2 | 11/2002 | Marini | |
| 6,486,036 B1 | 11/2002 | Miethke et al. | |
| 6,528,219 B1 | 3/2003 | Conrad et al. | |
| 6,556,947 B1 | 4/2003 | Scheiner et al. | |
| 6,681,151 B1 | 1/2004 | Weinzimmer et al. | |
| 6,898,306 B1 | 5/2005 | Lu | |
| 2001/0049589 A1 | 12/2001 | Yasuda et al. | |

* cited by examiner

Primary Examiner — Brian Le
(74) Attorney, Agent, or Firm — Silicon Valley Patent Group LLP (57) ABSTRACT

A method for processing wafers includes learning a first pattern at a de-skew site on a first wafer layer, saving the first patterns in a recipe for de-skewing wafers, learning a second pattern at the de-skew site a second wafer layer, and saving the second pattern in the same recipe for de-skewing wafers. Learning the first pattern may include determining a score of uniqueness for the first pattern. The method further includes finding the de-skew site on the second wafer layer using the first pattern before learning the second pattern. Finding the de-skew site includes determining a score of similarity between the first pattern and the second pattern. Learning the second pattern is performed when the score of similarity is less than a threshold value. A recipe for de-skewing wafers includes multiple patterns of a de-skew site of a wafer, wherein the patterns include a first pattern at the de-skew site on a first wafer layer and a second pattern at the de-skew site on a second wafer layer.

10 Claims, 6 Drawing Sheets

METHOD FOR AUTOMATICALLY DE-SKEWING OF MULTIPLE LAYER WAFER FOR IMPROVED PATTERN RECOGNITION

CROSS REFERENCE TO RELATED APPLICATION

This application is a divisional of U.S. patent application Ser. No. 09/974,721, filed Oct. 9, 2001, entitled "Method for Automatically De-Skewing of Multiple Layer Wafer for Improved Pattern Recognition," which is incorporated by reference herein in its entirety.

CROSS-REFERENCE TO COMPUTER PROGRAM LISTING APPENDIX

Note that a computer program listing CD-ROM Appendix originally filed in U.S. patent application Ser. No. 09/974,721 (see above) is hereby expressly incorporated by reference herein in its entirety.

The content of the CD-ROM Appendix is attached herein as an Appendix, which includes software written in pseudo code for an embodiment of a de-skewing method and is identified as:

| Date | Time | Size | File Name |
|---|---|---|---|
| Oct. 5, 2001 | 03:33 p | 40,448 | PSUDOC~1.DOC |

A portion of the disclosure of this patent document contains material which is subject to copyright protection. The copyright owner has no objection to the facsimile reproduction by anyone of the patent document or patent disclosure, as it appears in the U.S. Patent and Trademark Office patent files or records, but otherwise reserves all copyrights whatsoever.

FIELD OF THE INVENTION

The invention relates to semiconductor processing and more specifically to a method to de-skew a wafer at any processing step using a single recipe.

BACKGROUND

Repeated loading of a wafer onto a stage can introduce offsets in the coordinates of a location on the wafer where measurements are taken. De-skewing is a method to correct the offset. De-skewing is often performed prior to taking metrology measurements of the wafer at different steps of wafer processing.

To de-skew a wafer, initial coordinates of two or more unique sites ("de-skew sites") on a wafer are determined after the wafer is loaded onto a mechanical stage at a first time and subsequent coordinates of the two de-skew sites are determined after the wafer (or a different wafer) is loaded onto the stage at a subsequent time. A transformation matrix is calculated from the initial and the subsequent coordinates of the de-skew sites. The transformation matrix is used to convert between the initial and subsequent coordinates of a measurement location. Thus measurements can be taken at the same locations on the wafer with convenience and accuracy.

A conventional pattern recognition system can be used in the de-skew process. The conventional pattern recognition system uses a "recipe" that includes one image of each de-skew site of the wafer after one specific process (i.e., for a specific layer of the wafer). During certain wafer processes such as chemical mechanical planarization (CMP), pattern images of the de-skew sites may change so significantly that the pattern recognition system is unable to find the de-skew sites using one recipe. Thus conventionally the pattern recognition system uses a different recipe after each specific process (i.e., for each specific layer of the wafer).

SUMMARY

In accordance with embodiments of the invention, a method for processing wafers includes learning a first pattern at a de-skew site on a first wafer layer, saving the first pattern in a recipe for de-skewing wafers, learning a second pattern at the de-skew site on a second wafer layer, and saving the second pattern in the same recipe for de-skewing wafers. Learning the first pattern may include determining a score of uniqueness for the first pattern. Saving the first pattern may be performed when the score of uniqueness is greater than a threshold value.

In one embodiment, the method further includes finding the de-skew site on the second wafer layer using the first pattern before learning the second pattern. Finding the de-skew site may include determining a score of similarity between the first pattern and the second pattern. Learning the second pattern may be performed when the score of similarity is less than a threshold value.

In accordance with embodiments of the invention, a recipe for de-skewing wafers includes a plurality of patterns of a de-skew site on a surface of a wafer, wherein the plurality of patterns include a first pattern at the de-skew site of a first wafer layer and a second pattern at the de-skew site on a second wafer layer.

DETAILED DESCRIPTION

Figure 5A:
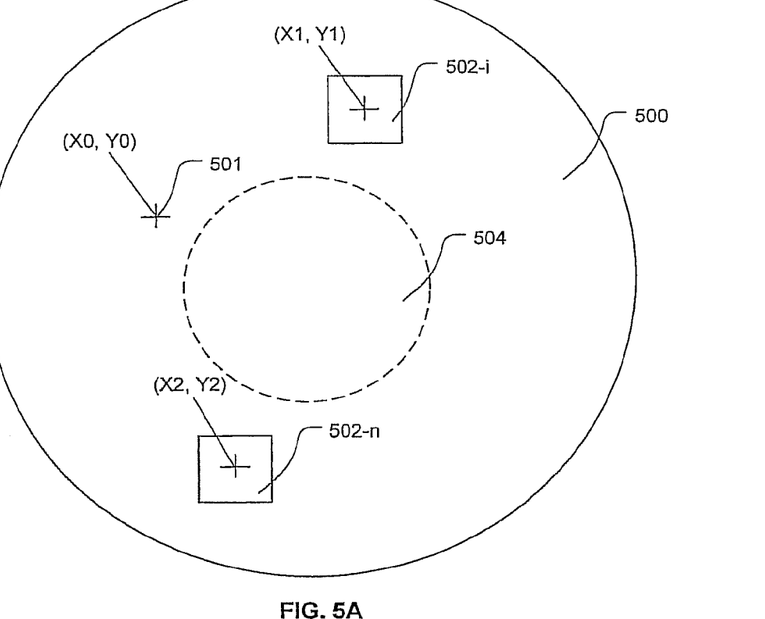
FIGS. 5A and 5B illustrate an exemplary calibration wafer with various de-skew sites.
Figure 5B:
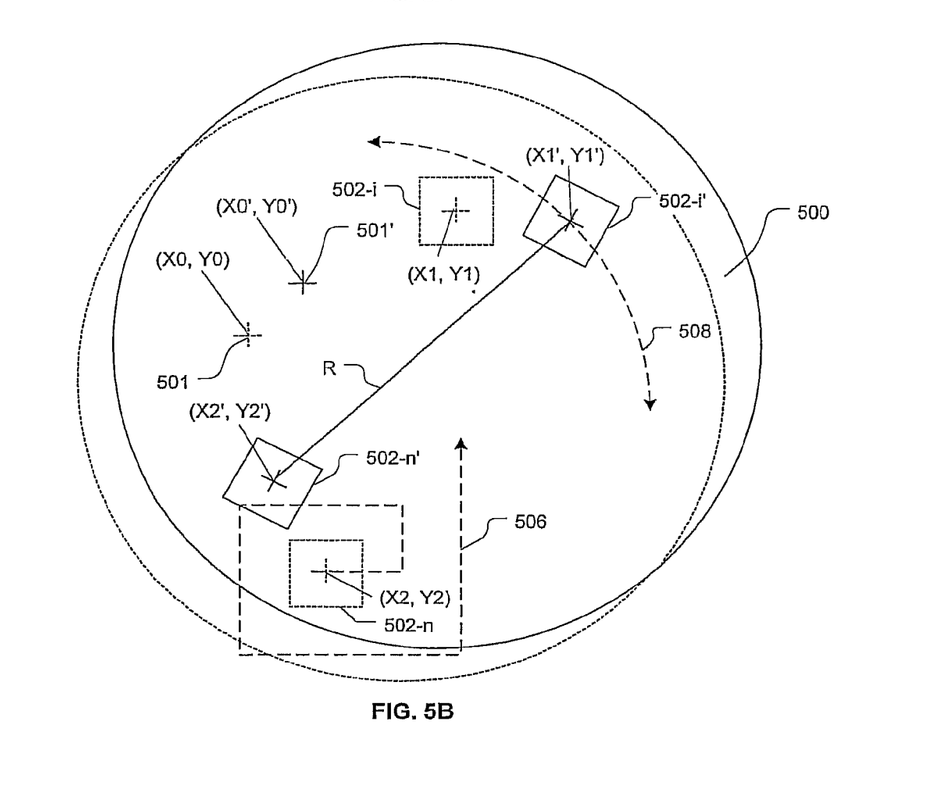
Figure 6A:
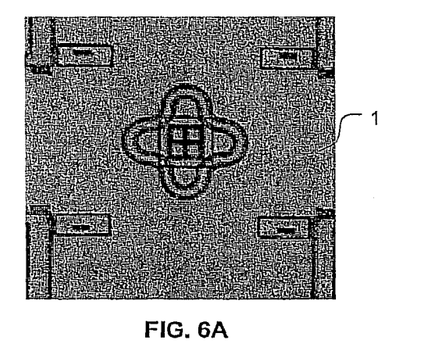
FIGS. 6A, 6B, 6C, 6D, 6E, and 6F illustrate exemplary patterns of a de-skew site at various stages of wafer processing.
Figure 6B:
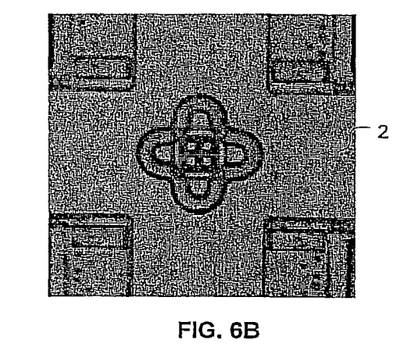
Figure 6C:
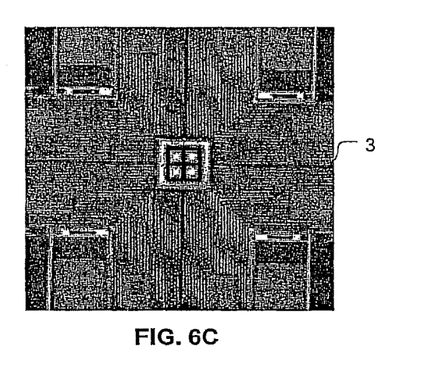
Figure 6D:
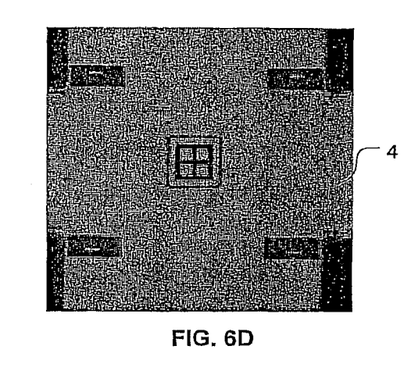
Figure 6E:
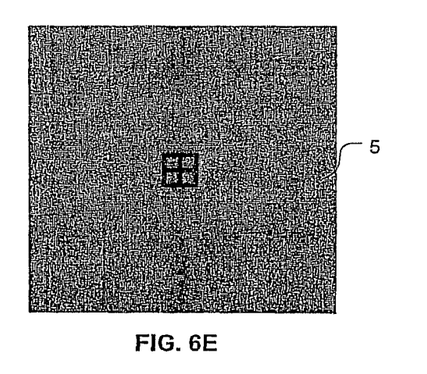
Figure 6F:
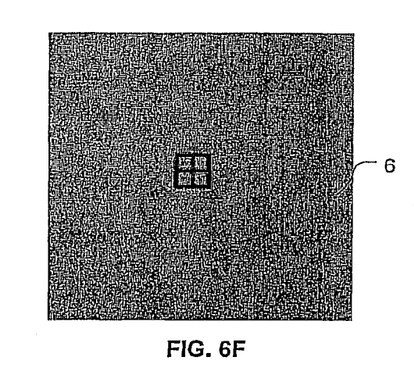

FIG. 5A shows a wafer 500 with a measurement site 501 and de-skew sites 502-$i$ and 502-$n$ (where $1<i<n$) placed on a mechanical stage 504 (shown schematically only in FIG. 5A). FIG. 5B shows wafer 500 placed on the stage at a later time with offsets to sites 501, 502-$i$, and 502-$n$ where the original positions of wafer 500 are shown with broken lines. The coordinates of sites 501, 502-$i$ and 502-$n$ have respectively changed from (X0,Y0) to (X0',Y0'), from (X1,Y1) to (X1',Y1'), and from (X2,Y2) to (X2',Y2'). FIGS. 6A-6F show patterns of, e.g., de-skew site 502-$i$ after various processes.

Figure 1:
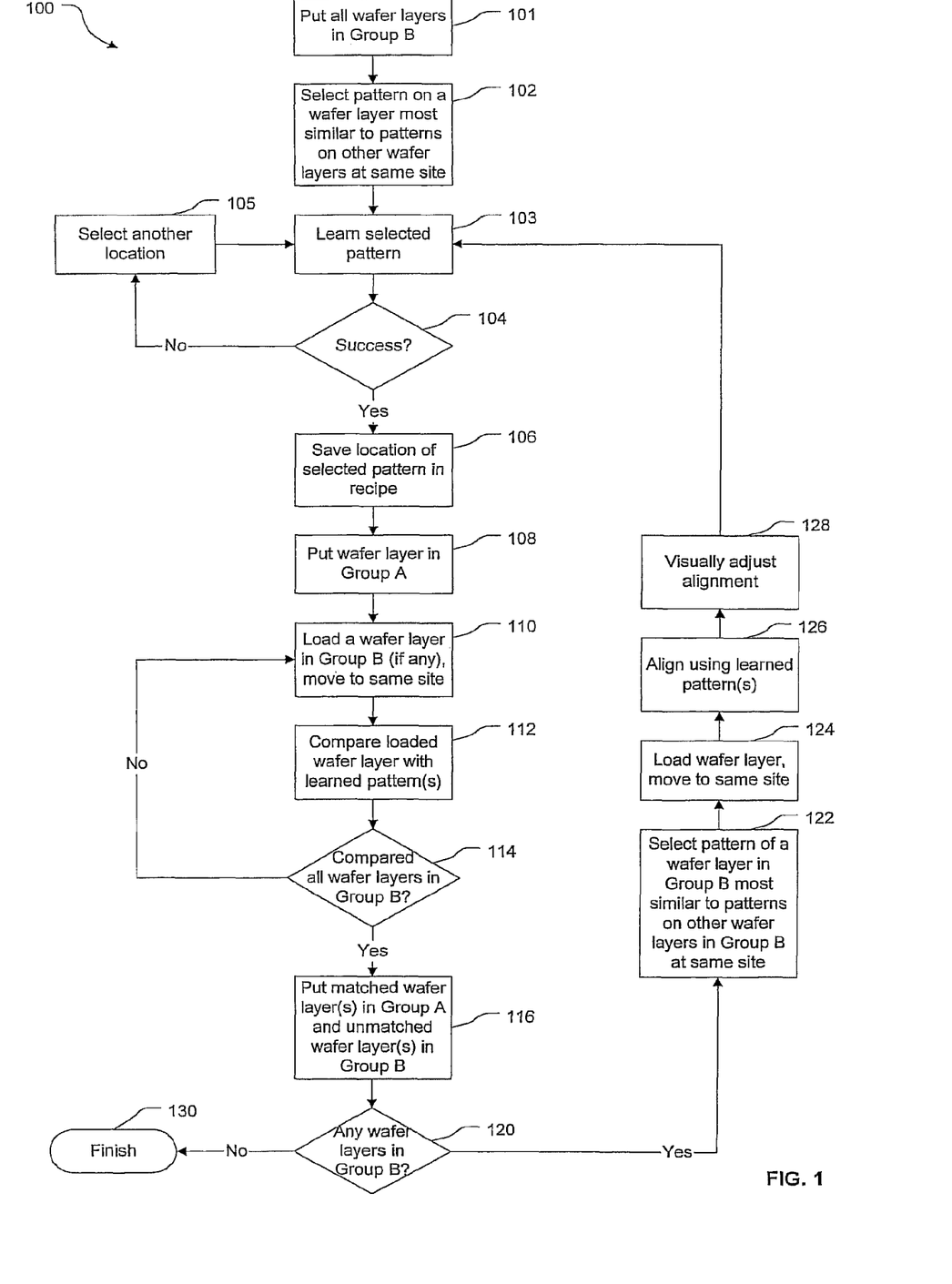
FIG. 1 illustrates a method for creating a single recipe for a wafer at any stage of wafer processing in accordance with embodiments of the invention.

FIG. 1 illustrates a calibration method 100 in embodiments of the invention for creating a single recipe for de-skewing wafer 500 at any stage in the processing of wafer. In one embodiment, method 100 is performed for each of de-skew sites 502-*i* and 502-*n*.

A pattern recognition system, or a user, or a combination of the pattern recognition system and the user can perform embodiments of method 100. The pattern recognition system can be standalone or part of a metrology measurement system used to characterize wafers before, during, and after wafer processing. The measurement system is, e.g., NanoSpec 9100 available from Nanometrics, Inc., of Milpitas, Calif.

In action 101 of method 100, all wafer layers of a calibration wafer (e.g., wafer 500 in FIG. 5A) are put into a group B. Group B includes all wafer layers where de-skew sites 502-*i* and 502-*n* have not been learned or can be recognized (describe later in action 112). In one embodiment, the user puts the wafer layers in group B.

In action 102, a pattern is selected at a de-skew site (e.g., de-skew site 502-*i*) on a wafer layer in group B. Hereafter the surface of a wafer after a specific process is referred to as a "wafer layer." For example, the surface of the wafer after a first process is called a first wafer layer, the surface of the wafer after a second process is called a second wafer layer, and so on.

In one embodiment, the pattern of de-skew site 502-*i* on a particular wafer layer (e.g., wafer layer 6 on FIG. 6F) is selected because the pattern is the most similar to patterns on de-skew site 502-*i* on other wafer layers (e.g., wafer layers 1-5 in FIGS. 6A-6E). By selecting a pattern that is most similar with the other patterns, the number of patterns that must be later learned to recognize the same de-skew site on different wafer layers is reduced.

In one embodiment, a unique pattern with good image contrast is selected. In one embodiment, de-skew sites 502-*i* and 502-*n* are selected to be as far away from each other in distance as possible. In one embodiment, the user visually selects a pattern for its uniqueness and similarity with the other patterns based on experience.

Figure 2:
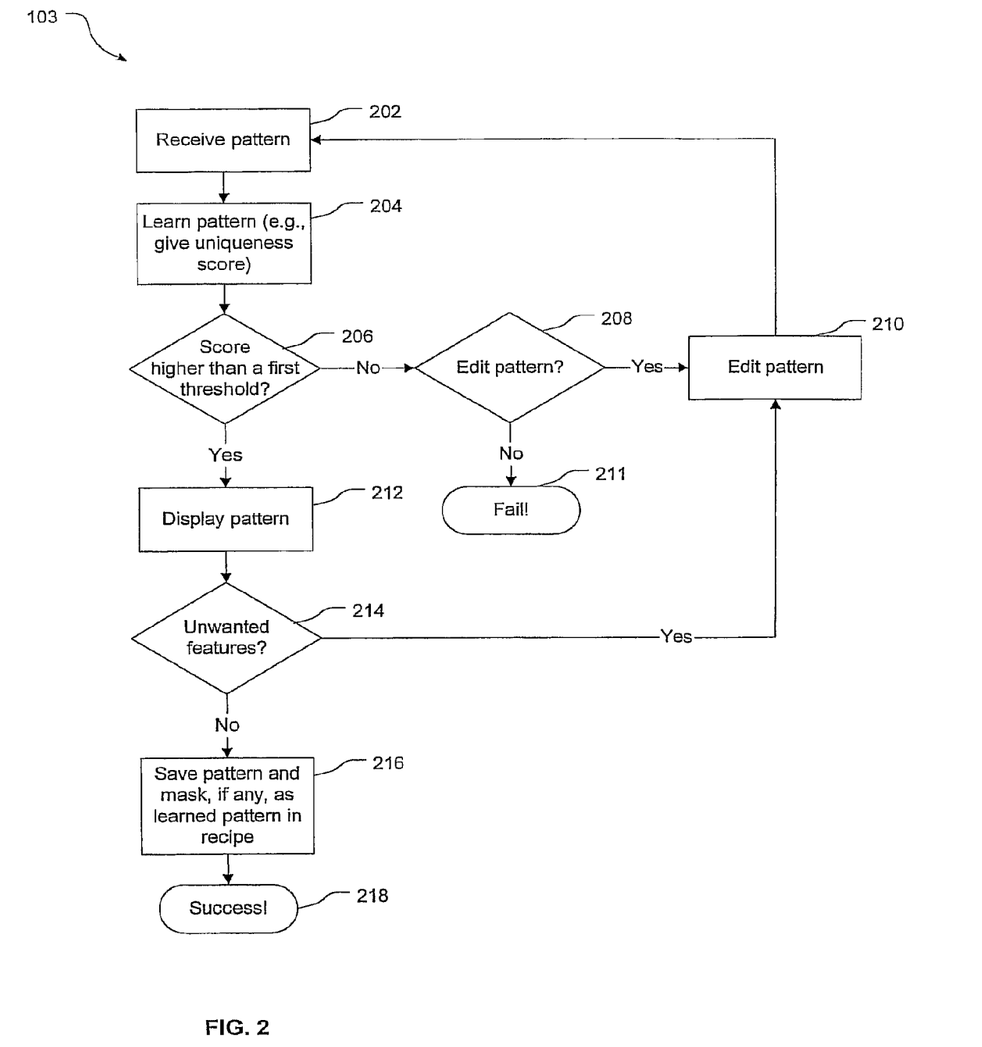
FIG. 2 illustrates a method for learning a pattern in the method in FIG. 1 in one embodiment.

In action 103, the selected pattern is learned. FIG. 2 shows one embodiment of action 103. Alternatively, the selected pattern is learned by conventional pattern recognition techniques.

In FIG. 2, action 202, the pattern is received. In one embodiment, the pattern recognition system receives the pattern from an input device such as a digital camera.

In action 204, a score is given to the pattern for its uniqueness (e.g., ease of recognition without error). In one embodiment, the pattern recognition system uses a software called "MTI Precision" available from Mathematical Technologies, Inc. of Providence, R.I., to determine the uniqueness score (e.g., 0 to 100). MTI Precision receives the pattern in grayscale pixels and outputs a score. Alternatively, the score may be given according to a conventional pattern recognition method.

In action 206, a determination is made as to whether or not the score of the pattern is higher than a uniqueness threshold value. If no, then action 206 is followed by action 208. If yes, then action 206 is followed by action 212. In one embodiment, the pattern recognition system makes the determination while the user sets the uniqueness threshold value. The threshold value is, e.g., 80.

In action 208, a determination is made as to whether or not to edit the pattern. If yes, action 208 is followed by action 210 where the pattern is edited. If no, action 214 is followed by action 211 that indicates a failure to learn the pattern. If the pattern at de-skew site 502-*i* is not learned, then another de-skew site needs be to selected and the previously learned patterns at de-skew site 502-*i* are discarded (described later in action 105 of FIG. 1). In one embodiment, the user makes the determination whether or not to edit the pattern.

In action 210, the pattern is edited. In one embodiment, the user selects unwanted features from the pattern and instructs the pattern recognition system to remove the unwanted features (e.g., by creating a mask to remove the unwanted features). The unwanted features may be uncommon between the patterns at the same de-skew site or reduce the uniqueness score of the pattern. The user may select to edit the pattern of the current de-skew site in action 210 to avoid selecting a new de-skew site (described later in action 105). Action 210 is followed by action 202, and the previously described actions cycle until a pattern with a uniqueness score above a threshold is created in action 210 or another de-skew site is selected in action 105 that follows action 211.

In action 212, the selected pattern is shown. In one embodiment, the pattern recognition system shows the selected pattern to the user on a video display.

In action 214, a determination is made as to whether or not the pattern includes unwanted features. If yes, action 214 is followed by the previously described action 210 where the unwanted features are removed. If no, action 214 is followed by action 216. In one embodiment, the user makes the determination whether the pattern includes unwanted features based on experience.

In action 216, the pattern is saved as a learned pattern. In one embodiment, the pattern recognition system uses MTI Precision to save the original pattern and the mask, if any, in a file, and a pointer (e.g., a file name) to the file in a single recipe in memory. Saving the pointer to the original pattern and the mask, if any, may be considered the equivalent of saving the original pattern and the mask in the recipe. Action 216 is followed by action 218 that indicates the pattern has been successfully learned.

Returning to action 104 of FIG. 1, a determination is made as to whether or not the pattern has been successfully learned. If yes, then action 104 is followed by action 106. If no, then action 104 is followed by action 105.

In action 105, a pattern at a new de-skew site (e.g., de-skew site 502-*n*) on the same wafer layer is selected. In one embodiment, the previously learned patterns for the old de-skew site (e.g., de-skew site 502-*i*) are discarded. In one embodiment, the user selects the new de-skew site according to the factors described in action 102 and the pattern recognition system erases the previously learned patterns at the old de-skew site from the recipe in memory. Action 105 is followed by the previously described action 103 where the pattern is learned.

In action 106, the location of the saved pattern is saved. In one embodiment, the pattern recognition system saves the current location of the center of de-skew site 502-*i*, (X1, Y1), in the recipe in memory. The location of de-skew site 502-*i* is only saved in the first iteration of method 100 or when a new de-skew site is selected in action 105. In one embodiment, the location is based on the coordinate system of stage 504.

In action 108, the wafer layer is placed in a group A. Group A includes all wafer layers where de-skew site 502-*i* has been learned or can be recognized (describe later in action 112). In one embodiment, the user puts the wafer layers in group A.

In action 110, a wafer layer in group B is loaded and positioned so de-skew site 502-*i* can be examined. In one embodiment, a loader conventionally loads the wafer onto a stage of the pattern recognition system and the user instructs the stage to position the wafer layer so the digital camera can capture the pattern at de-skew site 502-*i*.

Figure 3:
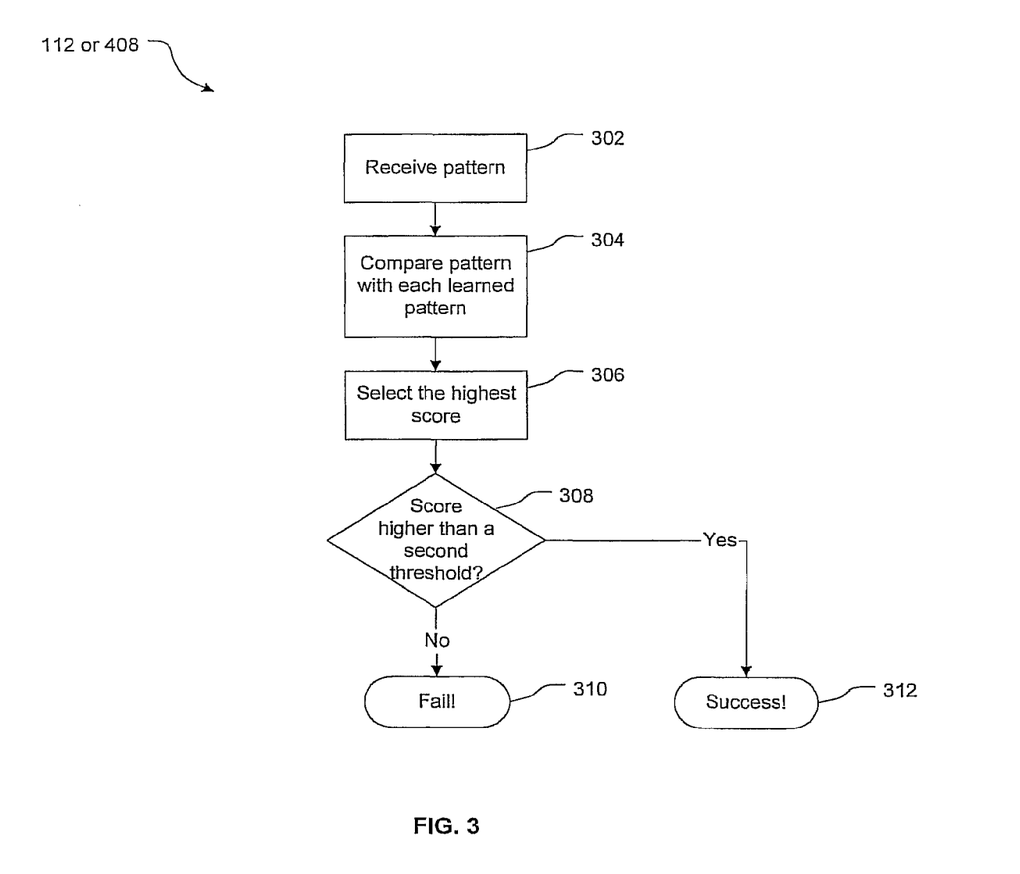
FIG. 3 illustrates a method for finding a de-skew site using a learned pattern in an action of the method in FIG. 1 in one embodiment.

In action 112, the pattern at de-skew site 502-*i* of the wafer layer is compared with the learned pattern. Although a single wafer at different steps of a manufacturing process may be used in actions 110 and 112, multiple wafers at different processing steps of the same manufacturing process can also be used. FIG. 3 shows one embodiment of action 112. Alternatively, the patterns are found by conventional pattern recognition techniques.

In FIG. 3, action 302, the pattern is received. In one embodiment, the pattern recognition system receives the pattern from the digital camera.

In action 304, the pattern is compared with each learned pattern in the recipe. The pattern is given a score of similarity with each learned pattern indicating how closely the two patterns match. In one embodiment, the pattern recognition system uses the software MTI Precision to determine the score of similarity (e.g., 0 to 100). MTI Precision may also output an offset from the original location of the learned pattern (e.g., from (X1,Y1)). MTI Precision software receives grayscale pixels of the pattern and outputs a score and an offset for each learned pattern. Alternatively, the score and the offset may be given according to a conventional pattern recognition method.

In action 306, the highest score generated from the learned patterns is selected. In one embodiment, the pattern recognition system selects the highest score for the pattern. In the initial iteration of method 100, there is only one learned pattern and therefore no selection is necessary.

In action 308, a determination is made as to whether or not the highest score is greater than a similarity threshold value. In one embodiment, the pattern recognition system makes the determination and the user sets the similarity threshold value. In one embodiment, the similarity threshold value is saved in the recipe. The similarity threshold value ranges, e.g., from 65 to 80. If the highest score is not greater than the similarity threshold value, then action 308 is followed by action 310. If the highest score is greater than the similarity threshold value, then action 308 is followed by action 312.

In action 312, the pattern is recognizable because it has been successfully matched with a learned pattern. In action 310, the pattern is not recognizable because it has not been matched with learned patterns. In one embodiment, the pattern recognition system saves the results of actions 310 and 312 (the result of the determination in action 308) in memory.

Returning to action 114 of FIG. 1, a determination is made whether or not all the wafer layers in group B have been compared with the learned patterns. If yes, then action 114 is followed by action 116. If no, then action 114 is followed by action 110 and method 100 cycles until all wafer layers in group B have been compared with the learned patterns. In one embodiment, the user makes this determination.

In action 116, the wafer layers that have a recognizable de-skew site 502-i are placed in group A, and the wafer layers that have an unrecognizable de-skew site 502-i are placed in group B. In one embodiment, the user puts the wafer layers in groups A and B.

In action 120, a determination is made as to whether or not there are wafer layers in group B. If yes, then action 120 is followed by action 122. If no, then action 120 is followed by action 130, which ends method 100 because all wafer layers have de-skew site 502-i recognizable by a single recipe. In one embodiment, the user makes this determination.

As previously discussed, method 100 can be repeated for additional de-skew sites (e.g., de-skew site 502-n) so the single recipe can be used for multiple de-skew sites. In one embodiment, the pattern recognition system performs method 100 for multiple de-skew sites in parallel. If the same patterns are formed at different de-skew sites of the same wafer layer, then new patterns do not need to be learned. However, the pattern recognition system would still need to find and save the locations of these additional de-skew sites by, e.g., using the learned patterns.

In action 122, a pattern of de-skew site 502-i on a wafer layer in group B (e.g., wafer layer 2 on FIG. 6B) is selected. In one embodiment, the selected pattern of de-skew sites 502-i on this wafer layer is the most similar to patterns of de-skew site 502-i on the other wafer layers in group B. In one embodiment, the pattern is selected for like reasons in action 102. In one embodiment, the user selects the pattern.

In action 124, the wafer layer is loaded and moved to examine de-skew site 502-i. In one embodiment, action 124 is similar to action 110.

In an optional action 126, the offset of de-skew site 502-i is calculated using the learned patterns in the recipe regardless of the similarity threshold value, and de-skew site 502-i is aligned according to the offset. In one embodiment, the pattern recognition system uses the software MTI Precision to output an offset from the last learned pattern and the user determines if the offset is reasonable. If the offset is reasonable, the user instructs the pattern recognition system to align de-skew site 502-i according to the offset (e.g., moving the wafer layer so the digital camera is directly above the center of de-skew site 502-i to capture the pattern). If the offset is not reasonable, the user visually aligns de-skew site 502-i (e.g., in action 128). MTI Precision software receives grayscale pixels of the pattern and outputs the offset. Alternatively, the offset may be determined by a conventional pattern recognition method.

In action 128, the alignment of de-skew site 502-i is visually adjusted. In one embodiment, the user makes fine visual adjustment by instructing the stage to position the wafer layer so the digital camera is directly above the center of de-skew site 502-i to capture the pattern. Action 128 is followed by the previously described action 103 where the pattern is learned.

In one embodiment of action 130, the recipe may hold only one pattern that can be used to recognize the same de-skew site on multiple wafer layers. In another embodiment of action 130, the recipe may hold multiple patterns where each pattern can be used to recognize the same de-skew site on at least one wafer layer. In yet another embodiment of action 130, the recipe may hold multiple patterns where each pattern can be used to recognize the same de-skew site on multiple wafer layers.

Figure 4:
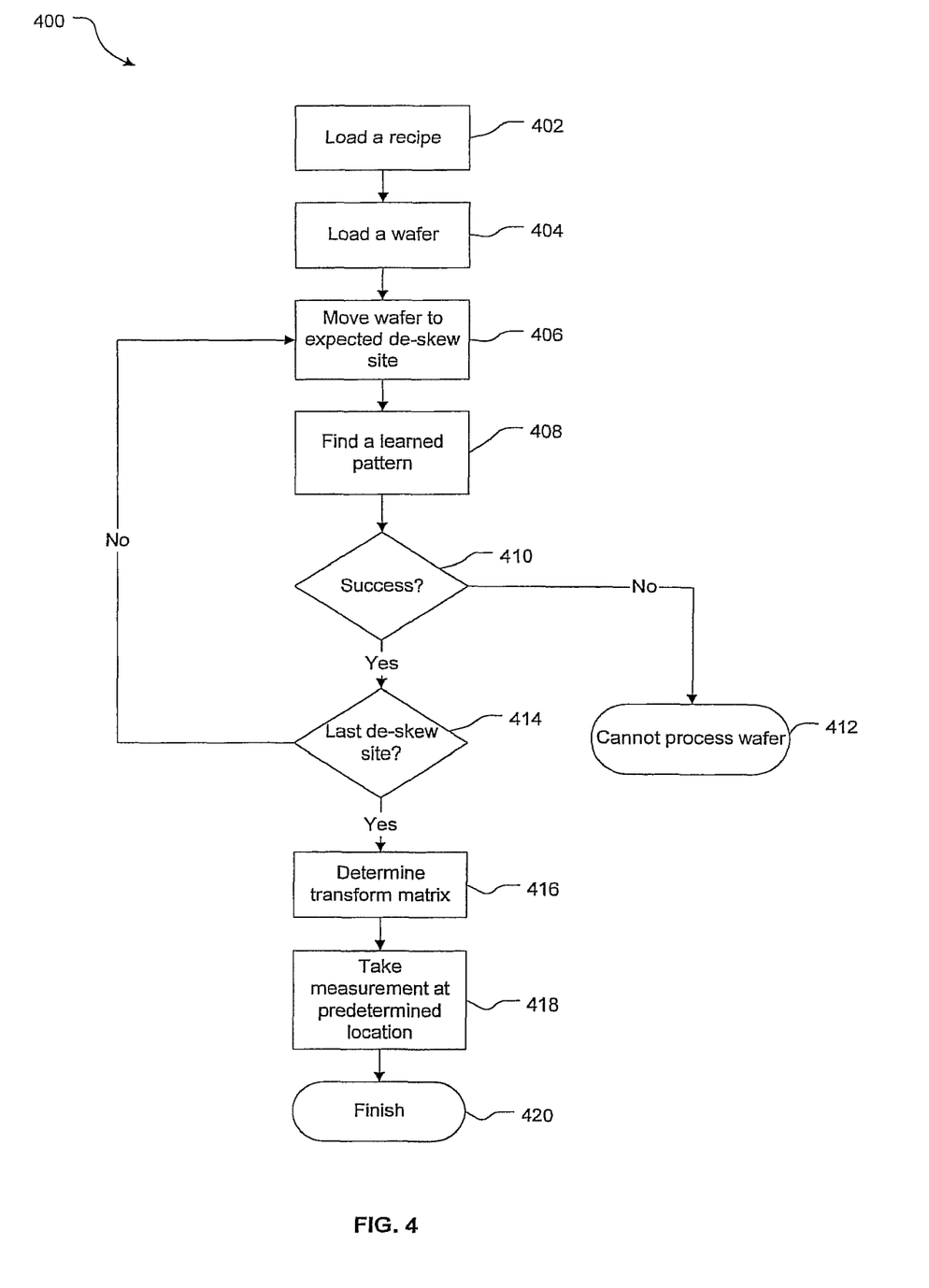
FIG. 4 illustrates a method for using the recipe created in the method of FIG. 1 in one embodiment.

FIG. 4 shows a method 400 for using the single recipe generated in method 100. Similar to method 100, a pattern recognition system, or a user, or a combination of the pattern recognition system and the user can perform embodiments of method 400. The pattern recognition system can be standalone or part of a metrology measurement system used to characterize wafers before, during, and after wafer processing.

In action 402, the recipe generated in method 100 is loaded. In one embodiment, the pattern recognition system loads the recipe into memory (e.g., retrieves from a database on a hard disk into RAM).

In actions 404 and 406, a wafer at any processing step (e.g., any wafer layer) is loaded and positioned so a de-skew site (e.g., de-skew site 502-i') can be examined. In one embodiment, the wafer layer is positioned to the expected location (e.g., saved location) of de-skew site 502-i. Actions 404 and 406 are like the previously described action 110.

In action 408, a search for de-skew site 502-i' of the wafer layer is performed by comparing patterns on the wafer layer with the learned patterns in the recipe. In one embodiment, the pattern recognition system uses MTI Precision to find de-skew site 502-i' on the wafer layer. Alternatively, de-skew site 502-i' may be searched according to a conventional pattern recognition method.

In one embodiment of method 400, wafer 500 may be loaded so the current locations (e.g., (X1',Y1') and (X2',Y2') in FIG. 5B) and the saved locations (e.g., (X1,Y1) and (X2, Y2) in FIG. 5B) of de-skew sites 502-*i* and 502-*n* are very distant. Thus in action 408 when the digital camera is placed over the saved locations, the captured pattern may not completely include the pattern of de-skew sites 502-*i* or 502-*n*. Thus, the pattern recognition system needs to search in a broader area for the patterns of de-skew sites 502-*i* and 502-*n*.

In one embodiment illustrated in FIG. 5B, the pattern recognition system starts the search at the saved location of one of the de-skew sites (e.g., the saved location of de-skew site 502-*n*) and captures patterns in an outwardly spiraling route 506. MTI Precision determines from each pattern whether there is a match with the learned patterns in the recipe (e.g., like action 112).

In a second pass through action 408 (once de-skew site 502-*i*' has been found), the pattern recognition system searches for de-skew site 502-*n*' on a circular perimeter 508 having a center at the location of de-skew site 502-*i*' and a radius R equal to the distance between de-skew sites 502-*i* and 502-*n*. In one embodiment, the pattern recognition system sweeps in incremental steps in alternating directions. The first search point on parameter 508 may be in the angle which the saved locations of de-skew sites 502-*i* and 502-*n* were oriented.

In action 410, a determination is made as to whether or not de-skew site 502-*i*' has been recognized. If no, action 410 is followed by action 412. If yes, action 410 is followed by action 414.

In action 412, the wafer is rejected because it cannot be de-skewed. In one embodiment, the pattern recognition system outputs an alarm that the wafer cannot be de-skewed to the user.

In action 414, a determination is made whether or not the last de-skew site has been recognized. If yes, then action 414 is followed by action 416. If no, action 414 is followed by the previously described action 406 where another de-skew site is examined. In one embodiment, the pattern recognition system makes this determination (e.g., if the second de-skew site has been recognized).

In action 416, a transformation matrix is determined. In one embodiment, the pattern recognition system uses a conventional Gauss elimination algorithm to calculate the transformation matrix from the saved coordinates of de-skew sites 502-*i* and 502-*n* (e.g., (X1,Y1) and (X2,Y2) in FIG. 5B) in the recipe and the just-determined coordinates of de-skew sites 502-*i*' and 502-*n*' (e.g., (X1',Y1') and (X2',Y2') in FIG. 5B).

In action 418, a measurement is taken at predetermined measurement site 501' on wafer 500 using the transformation matrix. In one embodiment, the pattern recognition system calculates new coordinates of measurement site 501' (X0', Y0') from the known coordinates of measurement site 501 (X0,Y0) using the transformation matrix. A metrology tool takes the measurement at the new coordinates of (X0',Y0') of measurement site 501'.

Table 1 illustrates an embodiment of the data structure of the recipe generated in method 100.

TABLE 1

```
////////////////////////////////////////////////////////////////////////////////////
// Deskew recipe data structure
////////////////////////////////////////////////////////////////////////////////////
define MAX_NUM_FILES = 10
struct DeskewRecipe
{
    int      m_nScoreThreshold;     //second score threshold, user specified
    int      m_nNumPRFiles;         //number of learnt pattern files for each deskew site. Must <=
                                      MAX_NUM_DESKEW_PRFILES
    CString  m_strDeskewName[2];    //deskew names that user specified for two deskew sites
    double   m_dX[2];               //x coordinates in mm for two deskew sites
    double   m_dY[2];               //y coordinates in mm for two deskew sites
    CString m_strPRFileName[2][MAX_NUM_DESKEW_PRFILES];
                                    //File names for MTI precision saving learned pattern(s)
                            information includes mask, if any, for two deskew sites. The
                            filenames are generated by software based on m_strDeskewName[i].
    //for deskew find only
    double   m_dCurrX[2];           //current x coordinates in mm for two deskew sites
    double   m_dCurrY[2];           //current y coordinates in mm for two deskew sites
};
```

Although the invention has been described with reference to particular embodiments, the description is a representative example and should not be taken as a limitation. For example, the actions 114 to 120 can be automated (e.g., performed by the pattern recognition system instead of the user). In addition, more than two de-skew sites can be used to de-skew wafer 500. Various other adaptations and combinations of features of the embodiments disclosed are within the scope of the invention as defined by the following claims.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A computer implemented method comprising:
   receiving by a computer a pattern of a first de-skew site on a layer on a wafer;
   finding in the computer a match of the pattern with one of a plurality of learned patterns in a recipe, wherein the recipe includes a first set of coordinates of the first de-skew site and the plurality of learned patterns includes learned patterns of the first de-skew site for different layers;
   determining in the computer a second set of coordinates of a second de-skew site on the layer;
   determining in the computer a transforming matrix from the first and the second sets of coordinates of the first and the second de-skew sites; and
   using the transforming matrix to de-skew the wafer.

2. The method of claim 1, wherein the recipe further includes the second set of coordinates of the second de-skew site and a second plurality of learned patterns of the second de-skew site.

3. The method of claim 1, wherein the plurality of learned patterns includes at least one common learned pattern of the first de-skew site for a plurality of layers on the wafer.

4. The method of claim 3, further comprising:
receiving a second pattern of the first de-skew site on a second layer on the wafer;
finding a match of the second pattern with the common learned pattern in the recipe;
determining the second set of coordinates of the second de-skew site on the second layer;
determining a second transforming matrix from the first and the second sets of coordinates of the de-skew site on the second wafer layer; and
using the second transforming matrix to de-skew the wafer.

5. The method of claim 1, further comprising:
receiving a second pattern of the first de-skew site on a second layer on the wafer;
finding a match of the second pattern with one of the plurality of learned patterns in the recipe;
determining the second set of coordinates of the second de-skew site on the second layer;
determining a second transforming matrix from the first and the second sets of coordinates of the de-skew site on the second wafer layer; and
using the second transforming matrix to de-skew the wafer.

6. A computer implemented method comprising:
receiving by a computer a de-skew pattern at a first de-skew site on a layer on a wafer;
finding in the computer a match of the de-skew pattern with a learned pattern in a recipe, wherein the recipe includes a first set of coordinates of the first de-skew site and the learned pattern, the learned pattern matching a plurality of patterns at the first de-skew site on a plurality of layers on the wafer;
determining in the computer a second set of coordinates of a second de-skew site on the layer;
determining in the computer a transforming matrix from the first and the second sets of coordinates of the first and the second de-skew sites; and
using the transforming matrix to de-skew the wafer.

7. The method of claim 6, wherein the recipe further includes the second set of coordinates of the second de-skew site and a second plurality of learned patterns of the second de-skew site.

8. The method of claim 6, wherein the learned pattern in the recipe is a first learned pattern, the recipe further includes at least one additional learned pattern matching the pattern at the first de-skew site on a layer of the wafer that is not matched by the first learned pattern.

9. The method of claim 8, further comprising:
receiving a second de-skew pattern at the first de-skew site on a second layer on the wafer;
finding a match of the second de-skew pattern with the at least one additional learned pattern in the recipe;
determining the second set of coordinates of the second de-skew site on the second layer;
determining a second transforming matrix from the first and the second sets of coordinates of the de-skew site on the second wafer layer; and
using the second transforming matrix to de-skew the wafer.

10. The method of claim 6, further comprising:
receiving a second de-skew pattern at the first de-skew site on a second layer on the wafer;
finding a match of the second de-skew pattern with the learned pattern in the recipe;
determining the second set of coordinates of the second de-skew site on the second layer;
determining a second transforming matrix from the first and the second sets of coordinates of the de-skew site on the second wafer layer; and
using the second transforming matrix to de-skew the wafer.

* * * * *